US006400399B1

(12) United States Patent
Anderson et al.

(10) Patent No.: US 6,400,399 B1
(45) Date of Patent: Jun. 4, 2002

(54) PROCESS FOR VIEWING A MOTION PICTURE FILM WITH CONCURRENTLY DISPLAYED SUBTITLE TEXT

(75) Inventors: Charles C. Anderson, Penfield; Robert O. James, Rochester; Ronald E. Uhlig, Pittsford; Keith A. Walker, Canandaigua; David C. Markham, Pittsford, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/408,800

(22) Filed: Sep. 30, 1999

(51) Int. Cl.$^7$ ............................ H04N 9/47; H04N 5/253
(52) U.S. Cl. ............................................. 348/96; 345/40
(58) Field of Search ........................ 348/96, 97, 110; 352/5, 3, 11, 12, 25, 31, 55, 59, 92, 129, 40; H04N 9/47, 5/253

(56) References Cited

U.S. PATENT DOCUMENTS

| | | | |
|---|---|---|---|
| 3,661,579 A | * 5/1972 | Vrancken et al. | 353/55 |
| 4,003,743 A | 1/1977 | Akashi et al. | |
| 4,279,945 A | 7/1981 | Audran et al. | |
| 4,341,855 A | 7/1982 | Morrison et al. | |
| 4,385,814 A | 5/1983 | Elliot | |
| 4,659,198 A | 4/1987 | Beauviala et al. | |
| 4,673,266 A | 6/1987 | Fiumi | |
| 4,854,696 A | 8/1989 | Guez | |
| 4,859,994 A | * 8/1989 | Zola et al. | 348/51 |
| 4,893,921 A | 1/1990 | Beauviala | |
| 4,938,585 A | 7/1990 | Weiffenbach et al. | |
| 4,965,627 A | 10/1990 | Robinson | |
| 5,367,348 A | 11/1994 | Nachmanson et al. | |
| 5,633,127 A | 5/1997 | Nair et al. | |
| 5,959,717 A | * 9/1999 | Chaum | 352/40 |

FOREIGN PATENT DOCUMENTS

WO    90/15361    12/1990

OTHER PUBLICATIONS

"Datakode Magnetic Control Surface", Eastman Kodak Company, 1983 (Publication No. V3–517).

* cited by examiner

Primary Examiner—Nhon Diep
(74) Attorney, Agent, or Firm—Andrew J. Anderson

(57) ABSTRACT

A process for viewing a motion picture film scene image with concurrently displayed subtitle text comprising: providing a motion picture print film comprising a support bearing at least one light sensitive image recording layer and a transparent magnetic recording layer; printing a negative film scene image onto the motion picture print film to form a positive scene image; recording subtitle information in the magnetic recording layer in synchronization with the scene image; projecting the print film scene image for viewing while simultaneously reading the subtitle information recorded in the magnetic recording layer; and converting the subtitle information to text comprising alphanumeric characters and displaying the subtitle text in conjunction with the projected screen image. One or more language subtitles may be recorded onto and read from a transparent magnetic recording layer on a motion picture film in synchronization with the film image. The subtitle information can be recorded prior to the original release of the film during the printing of the film or can be added to the film at a later time, for example, during re-release of the film in a foreign country. Alternatively, a previously recorded subtitle can be changed for re-release of the copy of the film in another country. The positive motion picture film may be displayed using a motion picture film projector equipped with a magnetic head that reads the subtitle information which is then converted to alphanumeric text and displayed in conjunction with the film image.

13 Claims, 5 Drawing Sheets

PROCESS FOR VIEWING A MOTION PICTURE FILM WITH CONCURRENTLY DISPLAYED SUBTITLE TEXT

FIELD OF THE INVENTION

The present invention relates generally to fields of motion picture, television and other multi-media production. More particularly, the invention relates to methods for recording subtitle information onto a transparent magnetic recording layer on a motion picture, television or other multi media photographic print film in synchronization with images recorded in the print film and displaying the subtitles during viewing of the film.

BACKGROUND OF THE INVENTION

The showing of foreign language films in a motion picture theater typically includes the simultaneous display of the translated dialogue as a subtitle. Subtitles are usually displayed as yellow or white text on the theater screen. Subtitling involves translation of the dialogue from the original language into a selected language, editing of the translation, and transfer of the subtitle text onto the processed positive motion picture (print) film. Typically, a feature length film requires about 1000 or more subtitles to provide the dialogue for the film. A current frequently used method of subtitle transfer, described in U.S. Pat. Nos. 4,854,696 and 5,367,348, for example, involves embossing or etching the subtitle text into the films photographic emulsion layer using a laser ablation technique. In this process, the photographic emulsion layer is selectively removed within the image frame to form the letters contained in the subtitle. Since subtitling involves the removal of the photographic emulsion layer, subtitles are permanent and only one language is normally subtitled on a given copy of a motion picture print film. In addition, the quality of the subtitle text image produced by the laser ablation process is highly dependent on the photographic film support material and the adhesion promoting layers employed beneath the photographic emulsion layer.

The current process of subtitling described above is both time intensive and costly. This is especially true in small foreign language markets since the subtitled film has a limited audience and the film cannot be re-subtitled and then used in another small language market.

Alternative means to provide subtitles for motion picture films have been described in the prior art. U.S. Pat. No. 4,673,266 describes the synchronization of a text reproduction device with a motion picture film containing a control code for the text reproduction device. This control code is preferably a bar code which is positioned either on the marginal edge of the film or between the film perforations, depending on the format of the film. The control code may also be recorded magnetically on a separate track on the film. U.S. Pat. Nos. 4,659,198 and 4,893,921 describe a process for recording coded information on the marginal edge of a perforated motion picture film. This coded information is in the form of dots or "optical bits" recorded on the film using an LED light source prior to normal film processing. The coded information allows the projection of a motion picture film to be synchronized with sound or subtitle text which is stored in a separate media. International Patent Application WO 90/15361 describes a control code for motion picture films in which the control code is present as optical, magnetic, mechanical or a similar marking between the film perforations. The control code allows the synchronization of the motion picture film projection with a subtitling device that stores and displays the associated subtitle text. In this patent application, it is suggested that the control code be made by blacking/not-blacking of the film strip between and on the exterior side of the perforations. U.S. Pat. No. 4,859,994 discloses use of a liquid crystal display device for providing close-captioning or subtitles with a film image, where the subtitle data may be contained on a magnetic tape attached to the film.

Other subtitling techniques have also been attempted. For example, one complicated method employs two separate print films, one print film containing the film image and another containing only the subtitles. These two print films are then projected simultaneously onto the theater screen using two separate film projectors.

The aforementioned methods for providing subtitles for motion picture films have several disadvantages. These include the need for a separate media which stores the associated subtitle text information which must be synchronized with the motion picture film. In addition, the use of bar codes, optical bits, blacking/not-blacking of the film in the areas around the film perforations, magnetic stripes, attachment of separate magnetic tapes, etc., may interfere with one or more of the sound tracks now used on motion picture films. Today, motion picture films may contain as many as four different sound tracks on a given print film. For example, the Digital Theater Sound (DTS) track appears next to the film image area; a conventional (dual bi-lateral) analog sound track is positioned between the DTS track and the perforations; the Dolby SR*D track is positioned between the perforations; and finally, the Sony Digital (SDDS) track is positioned at the edge of the film outside of the perforations. In addition, bar code and text are positioned at the edge of the film to provide film identification. Thus, there is very little space remaining in the non-image area of current motion picture films to add optical information for control codes. Optical control codes additionally are not easily changed or corrected since they entail permanent markings being added to the motion picture film.

The use of magnetic recording stripes or layers in photographic elements has been previously disclosed. An innovation in data communication between different stages of film use and processing for motion picture film was introduced as described in the publication "DATAKODE Magnetic Control Surface" by Eastman Kodak Company 1983 (Publication No. V3-517). A layer approximately 5 $\mu$m thick containing magnetic oxide particles was coated across the entire back surface of a roll of motion picture film to provide the capability to magnetically record digital data on the film without interfering with normal photographic use of the film. It has been suggested that this permitted recording of different types of digital data at different stages of production of a motion picture which allowed for information exchange such as camera, lighting and filter data at the time of shooting to printer exposure control information in the laboratory to theater automation control signals during exhibition. The use of magnetic recording stripes or layers on motion picture films for recording and playing back audio information has also been disclosed, such as in U.S. Pat. Nos. 4,003,743, 4,279,945, 4,341,855, 5,633,127. More recently, it has been proposed to employ a virtually transparent magnetic layer on still photography filmstrip to allow for magnetic recording of data in one or more longitudinal tracks associated with individual film image frames for information exchange purposes as part of the recently introduced Advanced Photo System. An example of such a system is described in commonly assigned U.S. Pat. No. 4,965,627 issued Oct. 23, 1990. In order to provide quick access to particular data at any stage of film use, related data is preferably grouped and recorded in specific predetermined tracks. Camera data is recorded in several dedicated longitudinal tracks located along the filmstrip edges. The data is preferably recorded in pulse position encoded form in order to be largely independent of film transport velocity. There has been no specific suggestion of a convenient method, however, to use such a transparent recording layer to provide subtitle information in one or more languages which may be easily recorded, changed, and read from a single motion picture print film without the need for synchronization of a separate media during projection of the print film, or interference with digital or analog sound tracks employed on the film.

Therefore, it is a general aim of the present invention to provide an improved method for recording subtitle information directly onto a motion picture film and for reading and displaying subtitle information stored on a motion picture film during viewing of the motion picture. It is a further aim of the invention to avoid the problems and limitations of the prior art and provide the ability to easily record, change, and read one or more subtitle languages on a single copy of a motion picture film. It is yet a further aim of the invention to provide a method which avoids the requirement of the use and synchronization of a separate media during viewing of the film, and which does not interfere with the playback of analog or digital sound tracks employed on motion picture films.

SUMMARY OF THE INVENTION

In accordance with the present invention there is provided a process for viewing a motion picture film scene image with concurrently displayed subtitle text comprising: providing a motion picture print film comprising a support bearing at least one light sensitive image recording layer and a transparent magnetic recording layer; printing a negative film scene image onto the motion picture print film to form a positive scene image; recording subtitle information in the magnetic recording layer in synchronization with the scene image; projecting the print film scene image for viewing while simultaneously reading the subtitle information recorded in the magnetic recording layer; and converting the subtitle information to text comprising alphanumeric characters and displaying the subtitle text in conjunction with the projected screen image.

In accordance with the invention, one or more language subtitles may be recorded onto and read from a transparent magnetic recording layer on a motion picture film in synchronization with the film image. The subtitle information can be recorded prior to the original release of the film during the printing of the film or can be added to the film at a later time, for example, during re-release of the film in a foreign country. Alternatively, a previously recorded subtitle can be changed for re-release of the copy. of the film in another country. The positive motion picture film may be displayed using a motion picture film projector equipped with a magnetic head that reads the subtitle information which is then converted to alphanumeric text and displayed in conjunction with the film image. The present invention provides a method to record, read and display one or more subtitles in synchronization with a motion picture film image. Unlike the prior art, the method employed in the present invention to add the subtitles does not involve the destruction of the photographic emulsion layer thus making it easy to change the subtitles at a later time. In addition, the present invention does not require the synchronization of the film image with a separate media containing the subtitle information.

DETAILED DESCRIPTION OF THE INVENTION

The present invention provides a process for viewing a positive motion picture film scene image with accompanying subtitled dialogue. The process includes the steps of recording subtitle information onto a transparent magnetic recording layer contained on a positive motion picture print film and viewing the processed motion picture print film with accompanying subtitles which are read from the transparent magnetic recording layer and displayed in conjunction with the film image. The subtitle text can be projected on the theater screen superimposed with the film image. Alternatively, the subtitle text may be shown on a separate display adjacent to, such as below, the theater screen.

In the practice of the present invention, digital subtitle information is recorded onto a transparent magnetic recording layer contained on a motion picture print film using a magnetic recording (write) head. Preferably, the subtitle information is recorded within the image frame to which it corresponds so that if a film splice is required due to film breakage, for example, the film image and subtitle information will remain in synchronization. The subtitle information can be recorded prior to the original release of the film during the printing of the film or can be added to the film at a later time, for example, during re-release of the film in a foreign country. In addition, a previously recorded subtitle can be changed for re-release of the film copy in another country.

When the subtitle information is recorded prior to the original release of the film it may be recorded during the contact printing operation that is used to transfer the film image from an exposed and processed "intermediate" negative film to the positive print film. Alternatively, the subtitle information may be recorded before optical printing, after optical printing, or after optical printing and film processing of the print film. The encoded subtitles may be recorded by conventional translational motion past a recording head or by anhysteretic recording from a tape or drum as described in U.S. Pat. Nos. 5,764,429, 5,581,417, 5,572,267, and 5,234,762. Regardless of when and how the subtitle information is recorded on the motion picture film, during the recording operation, an additional read head can be used to verify the subtitle information that was recorded onto the film.

Figure 1:
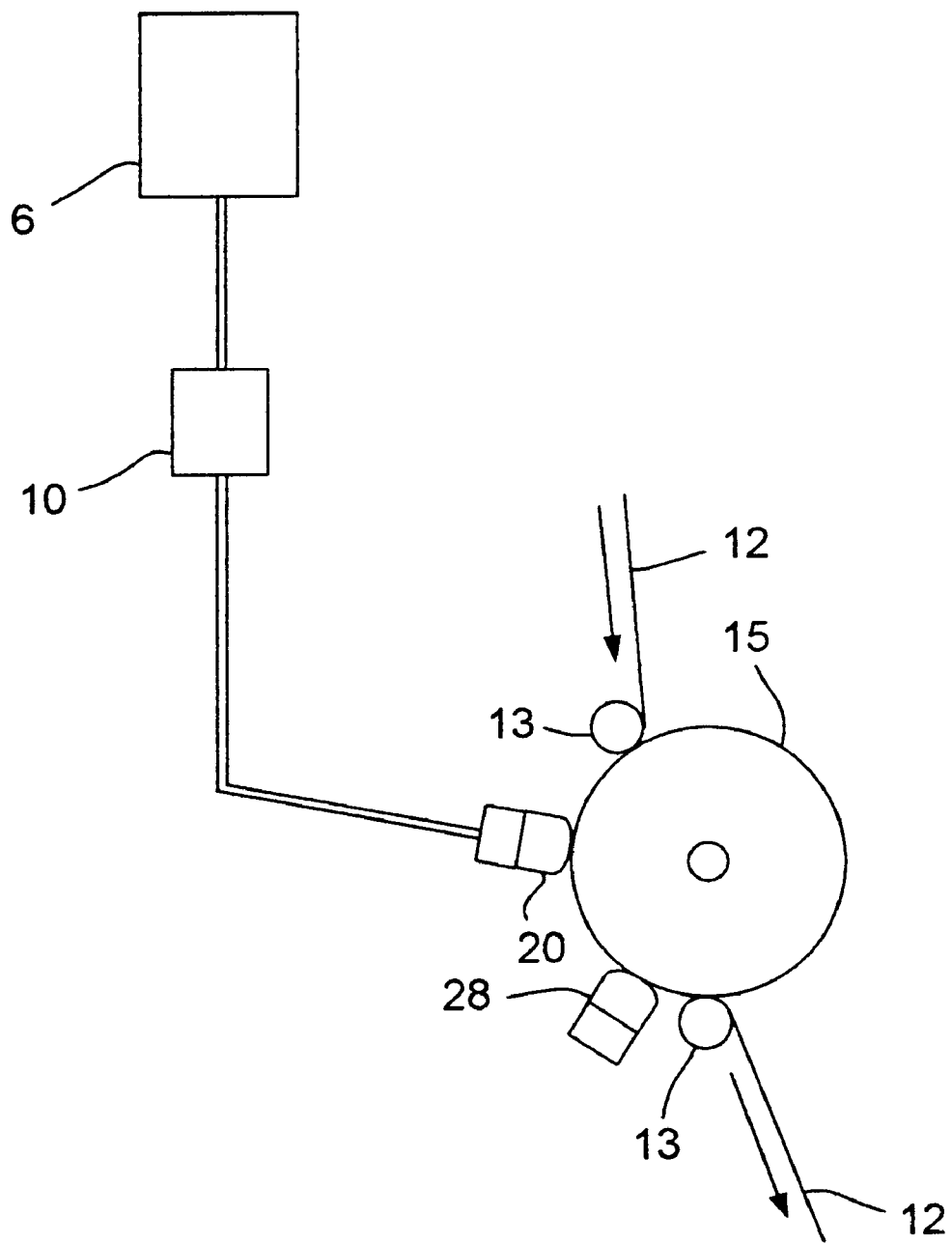
FIG. 1 is a schematic diagram showing a system for recording subtitle information onto a motion picture print film.

Referring now to FIG. 1, a schematic diagram illustrating an exemplary system for recording subtitle information onto a motion picture print film is shown. Rollers 13 guide the motion picture print film 12 onto record drum 15. Subtitle information stored in central processing unit 6 is fed through write head driver 10 to the write head 20 which transfers the subtitle information onto the transparent magnetic recording layer on the backside of the motion picture print film 12. An additional read head 28 can be used to verify the subtitle information recorded on the motion picture print film 12.

The subtitle information that is recorded on the motion picture film can include the subtitle text in one or more languages; a code to identify the subtitle language so that the subtitles for a particular language or languages can be selectively read and displayed; display information for the subtitle such as the intensity or the color of the subtitle text display so that the subtitle display can be continually and automatically adjusted depending on the brightness and color of the film image background. The subtitle information can be recorded on each frame of the film and then be read, converted to alphanumeric text and displayed on a frame-by-frame basis in synchronization with the film image. Alternatively, the subtitle text information is recorded only on the first frame of a dialogue sequence and then displayed for a given duration of time that may be controlled in one of several ways. For example, the starting signal of a successive subtitle can be used to terminate a prior subtitle in the case of running dialogue. Alternatively, the duration of a subtitle display may be controlled by a control code which is recorded and read along with the associated subtitle text.

The motion picture print film may be then projected using a motion picture film projector equipped with a magnetic read head thus enabling one to view the film image with display of integral subtitles. The exact position of the magnetic read head in the projector can vary from projector type to projector type, depending on where space is available to mount the magnetic head. However, the magnetic read head must be in the film path prior to the projector lamp and lens (unless the subtitle information is recorded on the print film in an area in advance of the image scene to which it corresponds). Therefore, it may be necessary to temporarily store the subtitle information read for a particular frame in buffer memory thus delaying the display of the subtitle information until the image frame corresponding to the subtitle information is in line with the projector lens so that subtitle and image will be in synchronization.

Figure 2:
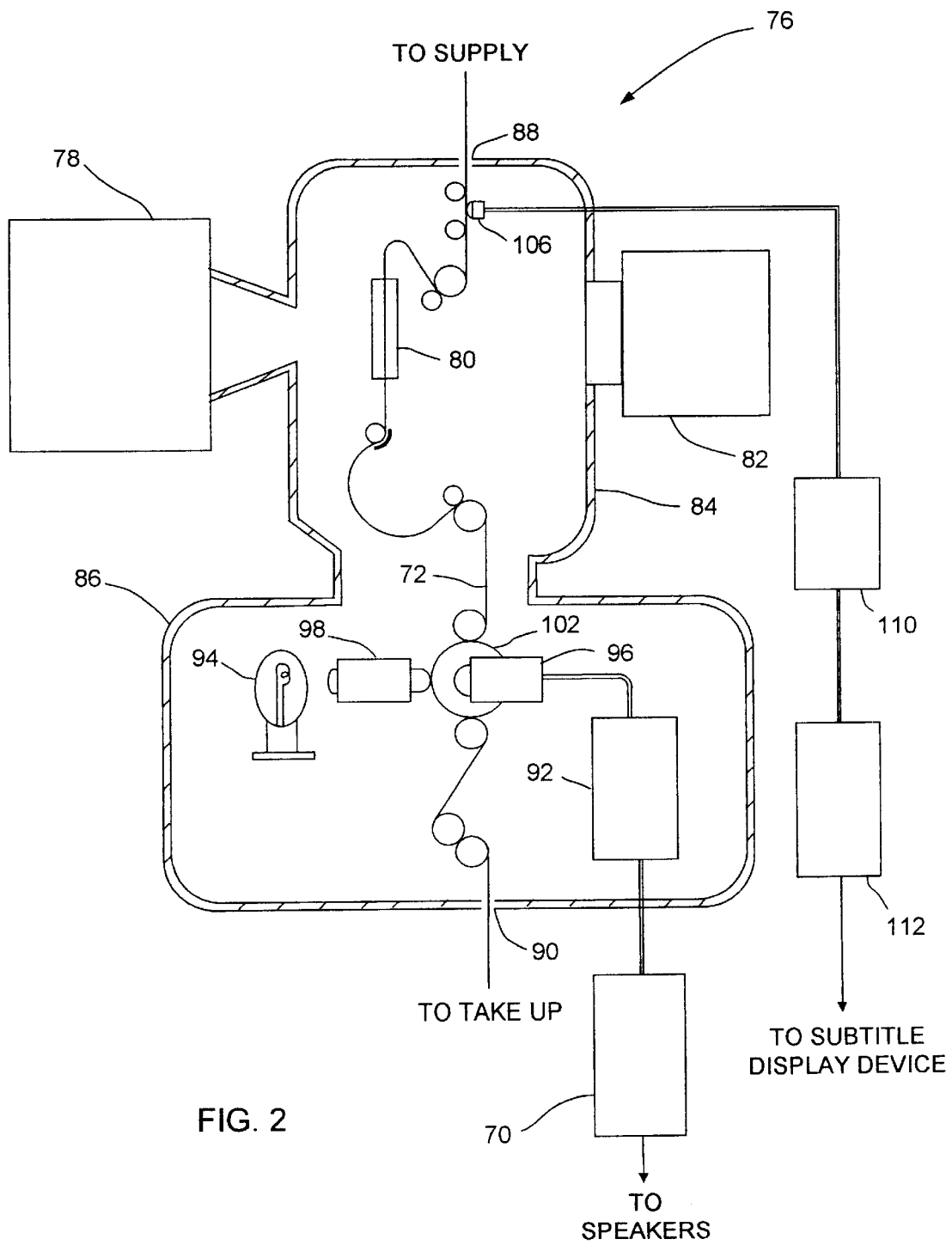
FIG. 2 is a schematic diagram of a motion picture projector that can be used to read subtitle information from a transparent magnetic recording layer on a motion picture print film.

Referring now to FIG. 2, wherein a schematic diagram of a motion picture projector for use in the present invention is illustrated. The motion picture projector 76 is essentially a conventional motion picture projector that additionally allows subtitle information to be read from a transparent magnetic recording layer contained on the print film. The motion picture projector 76 includes a projection light source 78, a film gate 80 and a projection lens 82 associated with projection housing 84. The motion picture projector 76 is also depicted with a conventional sound assembly housing 86 typically used for reading optical soundtracks printed on the print film. Sound assembly housing 86 includes a light source 94, sound system lens 98, drum 102, photodetectors 96 and preamplifier 92. In the practice of the present invention, print film 72 enters the projection housing 84 from a supply (not shown) through opening 88 in the top of projection housing 84. Subtitle information stored on the transparent magnetic recording layer contained on the backside of print film 72 is picked up by a magnetic read head 106 mounted in the projection housing 84, fed to read preamplifier 110, then sent to central processing unit 112 and the output of the central processing unit 112 is then sent to a subtitle display device (not shown). The print film 72 then passes through film gate 80, out of the projection housing 84 and into the sound assembly housing 86 before exiting the sound assembly housing 86 through opening 90. In the sound assembly housing 86 the optical sound track contained typically contained on a print film may be read in a conventional manner and the audio signal is fed through an amplifier 70 to the theater speaker system.

Figure 3A:
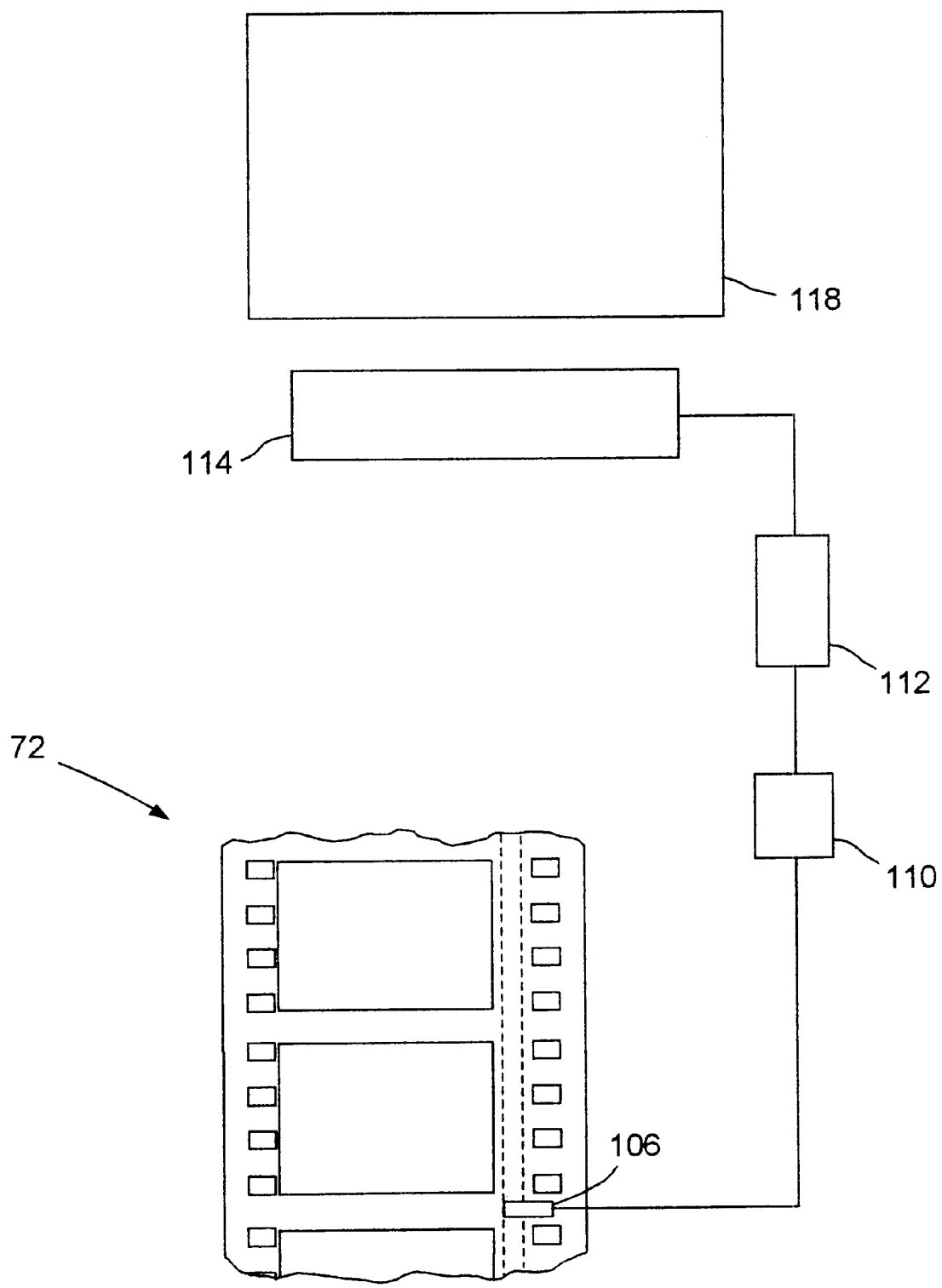
FIGS. 3a and 3b are schematic diagrams illustrating systems for reading subtitle information from a transparent magnetic recording layer on a motion picture print film and displaying such subtitle information in conjunction with the projected screen image.
Figure 3B:
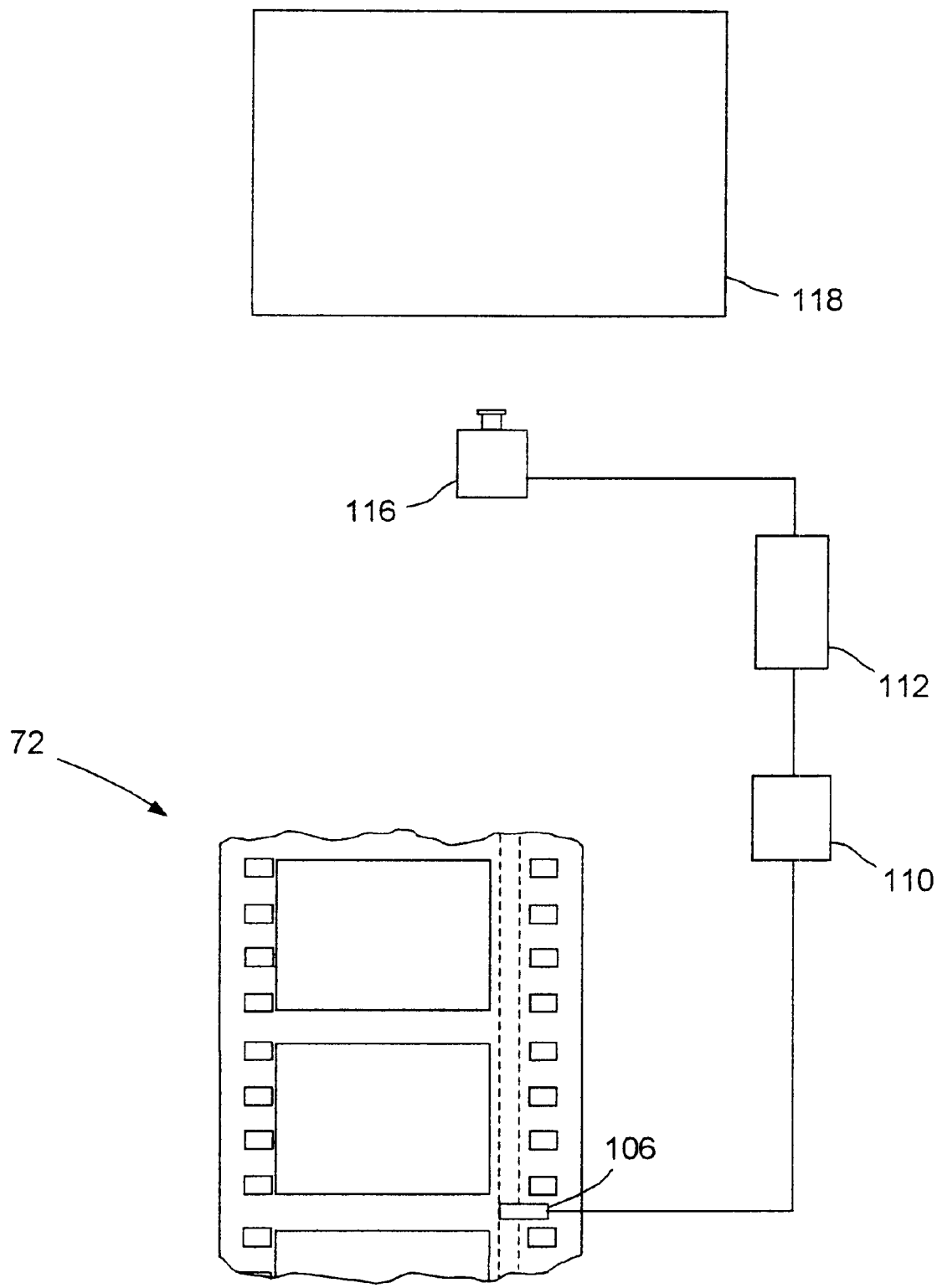

Turning now to FIGS. 3a and 3b, the subtitle information that is read from the print film 72 by read head 106 contained in the motion picture projector (not shown) is fed to preamplifier 110 and sent to central processing unit 112 where the subtitle information is decoded to alphanumeric characters, optionally temporarily stored in buffer, and then displayed in conjunction with the film image projected on the theater screen 118 using conventional text reproduction and displaying devices, such as disclosed in, e.g., U.S. Pat. Nos. 4,673,266, 4,859,994, and WO 90/15361. For example, the subtitle text may be shown on a separate display device 114 adjacent to, such as below, the theater screen 118. Alternatively, the subtitle text may be projected superimposed on the theater screen 118 using text projection device 116.

Figure 4:
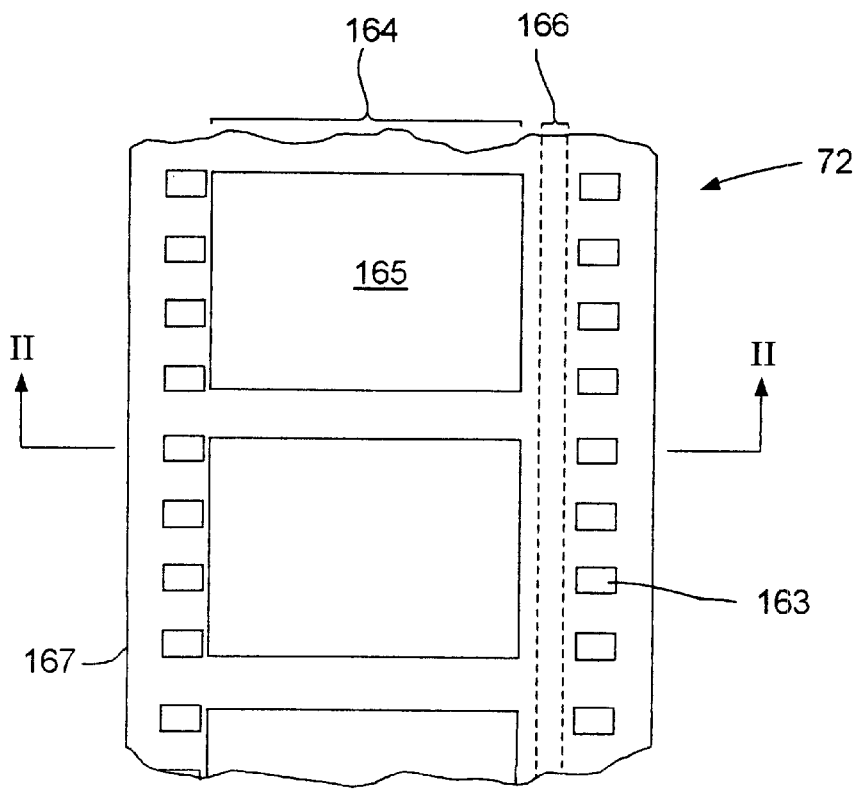
FIG. 4 is a top plane view of a motion picture film having a transparent magnetic recording layer useful in the practice of the present invention.
Figure 5:
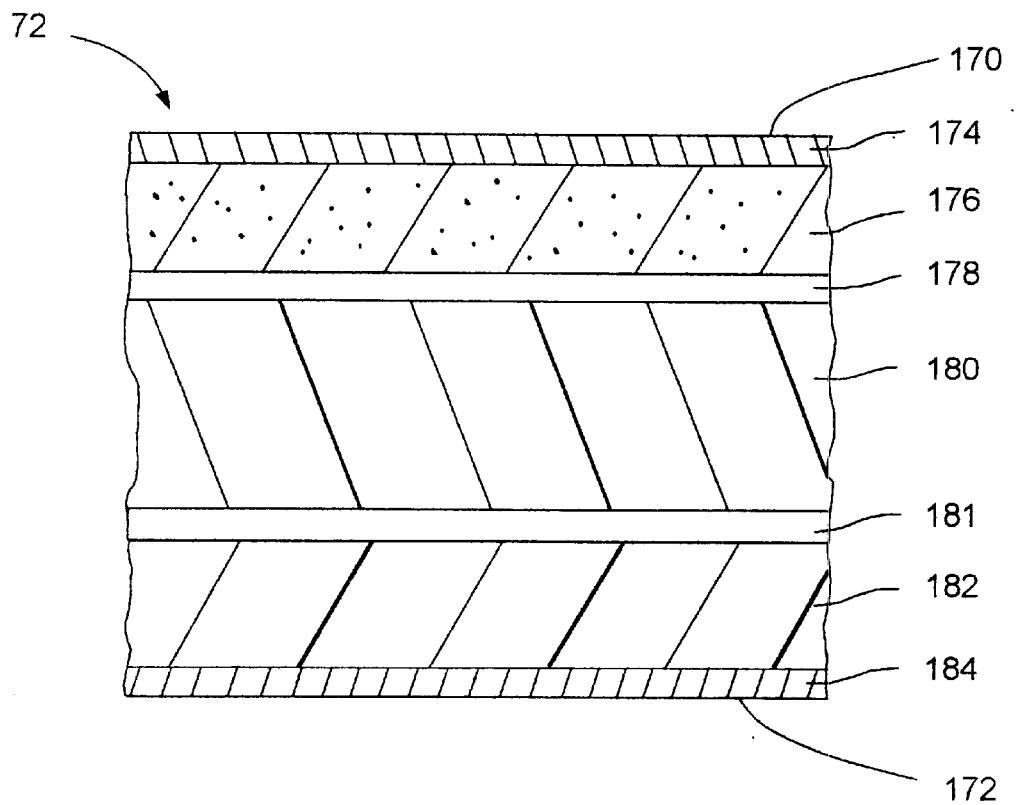
FIG. 5 is a cross-sectional view of the motion picture film of FIG. 4 as taken along line II—II.

Referring now to FIGS. 4 and 5 there is shown a motion picture film 72 for use in the present invention, FIG. 4 shows a top plane view of the motion picture film 72 while FIG. 5 is a cross-sectional view of the motion picture film 72 of FIG. 4 as taken along line II—II.

On motion picture film 72 there is provided image area 164 wherein images 165 are formed in a light-sensitive image recording layer 182. Also provided on motion picture film 72 is magnetic recording area 166, which in the particular embodiment illustrated is disposed laterally outside of the image area 164 and adjacent to the perforations 163. This "inboard" location for the magnetic recording area 166 is preferred since the film is very flat in this area which insures good film to magnetic read or write head contact. However, since the transparent magnetic recording layer 176 is coated across the entire film surface, the magnetic recording area 166 may be located elsewhere. For example, between the film perforations 163 and the edge of the film 167 on either side or both sides of the motion picture film 72.

Referring now to FIG. 5, the motion picture film 72 comprises a backside surface 170 and a frontside surface 172. The motion picture film 72 includes a support member 180 and disposed on one side thereof, in order from the backside surface 170, a thin lubricant layer 174, a transparent magnetic recording layer 176, and, in the particular embodiment illustrated, an antistatic layer 178. Optionally, a priming or subbing layer (not shown) which is well known in the photographic art may be employed between the antistatic layer 178 and the support member 180 in order to improve adhesion. Disposed on the opposite side of the support member 180, in order from the frontside surface 172, a protective overcoat layer 184, light-sensitive image recording layer(s) 182, and, in the particular embodiment illustrated, an antihalation underlayer 181. Optionally, a priming or subbing layer (not shown) which is well known in the photographic art may be employed between the antihalation underlayer 181 and the support member 180 in order to improve adhesion.

The materials employed as the support member are synthetic high molecular weight polymeric materials. These materials may be comprised of various polymeric films, but polyester and cellulose triacetate film supports, which are well known in the art, are preferred. The thickness of the support is not critical. Conventional support member thicknesses of from about 50 to 250 microns (2 to 10 mils, or 0.002 to 0.010 inches) can be employed, for example, with very satisfactory results. If the thickness is below 50 microns, the emulsion induced curl makes it difficult to maintain head/media contact without increasing the load and wear on the film surface. If the thickness is more than 250 microns the media is very stiff and this affects film transport and head media contact as well as reducing the length of film that can be loaded into a magazine. Polyester support members typically employ an undercoat or primer layer between the functional layers and the polyester support. Such undercoat layers are well known in the art and comprise, for example, a vinylidene chloride/methyl acrylate/itaconic acid terpolymer or vinylidene chloride/acrylonitrile/acrylic acid terpolymer as described in U.S. Pat. Nos. 2,627,088; 2,698,235; 2,698,240; 2,943,937; 3,143,421; 3,201,249; 3,271,178 and 3,501,301.

The photographic print films useful in the practice of the present invention comprise at least one light sensitive image recording layer. Such films can be simple black-and-white or monochrome elements or they can be multilayer and/or multicolor elements. Color photographic films useful for this invention typically contain dye image-forming units sensitive to each of the three primary regions of the spectrum. Each unit can be comprised of a single silver halide emulsion layer or of multiple emulsion layers sensitive to a given region of the spectrum. The layers of the element, including the layers of the image-forming units, can be arranged in various orders as is well known in the art.

In accordance with preferred embodiments of the invention, the print film comprises a negative working color print film, which may be used in conjunction with a negative film image (e.g., obtained in an origination or intermediate color negative film) to provide a positive film image. Color negative films are a class of photosensitive materials that map the luminance (neutral) and chrominance (color) information of a scene to complementary tonal and hue polarities in the negative film. Light areas of the scene are recorded as dark areas on the color negative film, and dark areas of the scene are recorded as light areas on the color negative film. Colored areas of the scene are recorded as complementary colors in the color negative film: red is recorded as cyan, green is recorded as magenta, blue is recorded as yellow, etc. In order to render an accurate reproduction of a scene recorded in a color negative film, a subsequent process is necessary to reverse the luminance and chrominance information back to those of the original scene. In the motion picture industry, one such subsequent process is to optically print (by contact or optics) the color negative film onto another negative working photosensitive material, such as a color print film, to produce a color positive image suitable for projection. Photographic print films typically use relatively small grain, high chloride emulsions (e.g., emulsions having average grain size equivalent circular diameters of less than about 1 micron and halide contents of greater than 50 mole % chloride) in order to optimize print image quality and enable rapid processing. Such emulsions typically result in relatively low speed photographic elements in comparison to camera negative films. Low speed is compensated for by the use of relatively high intensity print lamps or lasers for exposing such print elements. For comparison purposes, it is noted that motion picture color print films, e.g., when rated using the same international standards criteria used for rating camera negative films, would typically have an ISO speed rating of less than 10, which is several stops slower than the slowest camera negative films in current use. The compositions of typical light sensitive image recording layers used in origination negative films and print films are well known, and are not critical to the invention, as any of the silver halide materials used in conventional motion picture films may be used, such as those described, e.g., in Research Disclosure, Item 36544, September, 1994, and the references listed therein.

The motion picture films useful in the practice of the present invention include a transparent magnetic recording layer. Transparent magnetic recording layers for use on imaging elements such as photographic films are well known in the imaging art and are described, for example, in U.S. Pat. Nos. 3,782,947; 4,279,945; 4,302,523; 4,990,276; 5,147,768; 5,215,874; 5,217,804; 5,227,283; 5,229,259; 5,252,441; 5,254,449; 5,294,525; 5,335,589; 5,336,589; 5,382,494; 5,395,743; 5,397,826; 5,413,900; 5,427,900; 5,432,050; 5,457,012; 5,459,021; 5,491,051; 5,498,512; 5,514,528 and others; and in Research Disclosure, item No. 34390 (November, 1992). Preferably, such magnetic recording layers comprises materials of the type employed in the recently commercialized Advanced Photo System and described in U.S. Pat. Nos. 5,395,743; 5,397,826; 5,427,900; 5,432,050; 5,436,120; and 5,424,037. While the use of magnetic recording layers with motion picture films has been previously suggested as discussed above with respect to DATAKODE systems, compared to the newly commercialized Advanced Photo System consumer films in which the magnetic recording layer is about 1.2 $\mu$m thick, the DATAKODE magnetic control surface was a relatively thick layer of magnetic oxide (about 5 micron) that was coated across the entire surface of a roll of motion picture film. The DATAKODE magnetic recording layer had limited recording density capability due to its wide pulse width, leading to poorer resolution between flux reversals, and imparted undesirable optical density and color to the motion picture film. In addition, the DATAKODE magnetic recording layer was overcoated with a carbon black-containing layer which functioned as an antihalation layer and antistatic layer for the unprocessed film. The presence of this carbon black-containing overcoat on unprocessed films created a spacing loss between the magnetic recording layer and the magnetic read and write heads, thus negatively impacting the magnetic recording characteristics of the DATAKODE film by reducing signal amplitude and increasing the noise levels. Thus it would be undesirable for use in the practice of the present invention. Accordingly, in preferred embodiments of the invention, a photographic film is used employing a relatively thinner magnetic recording layer in combination with antistatic and antihalation layers as described below, rather than a relatively thick magnetic recording layer in combination with a carbon black-containing overcoat backing layer as employed with DATAKODE films.

Transparent magnetic recording layers that may be effectively employed for the purpose of the present invention comprise a film-forming polymeric binder, ferromagnetic particles, and other optional addenda for improved manufacturability or performance such as dispersants, coating aids, fluorinated surfactants, crosslinking agents or hardeners, catalysts, charge control agents, lubricants, abrasive particles, filler particles, plasticizers and the like.

Suitable ferromagnetic particles comprise ferromagnetic iron oxides, such as: $\gamma$-$Fe_2O_3$ or magnetite; $\gamma$-$Fe_2O_3$ or magnetite with Co, Zn, Ni or other metals in solid solution or surface-treated; ferromagnetic chromium dioxides such as $CrO_2$ or $CrO_2$ with Li, Na, Sn, Pb, Fe, Co, Ni, Zn or halogen atoms in solid solution; ferromagnetic hexagonal ferrites, such as barium and strontium ferrite; ferromagnetic metal alloys with protective oxide coatings on their surface to improve chemical stability. Other surface-treatments of magnetic particles to increase chemical stability or improve dispersability known in the conventional magnetic recording art may also be practiced. In addition, ferromagnetic oxide particles can be overcoated with a shell consisting of a lower refractive index particulate inorganic material or a polymeric material with a lower optical scattering cross-section as taught in U.S. Pat. Nos. 5,217,804 and 5,252,444. Suitable ferromagnetic particles can exhibit a variety of sizes, shapes, and aspect ratios. Particularly preferred ferromagnetic particles for use in transparent magnetic layers on motion picture films for use in the present invention include cobalt surface-treated $Fe_3O_4$ (magnetite) with a specific surface area greater than 30 $m^2/g$, preferably more than 40 $m^2/g$.

As taught in U.S. Pat. No. 3,782,947, whether an imaging element is useful for both photographic and magnetic recording depends both on the size distribution and the concentration of the ferromagnetic particles and on the relationship between the granularities of the magnetic and photographic layers. Generally, the coarser the grain of the silver halide emulsion in the photographic film containing a magnetic recording layer, the larger the mean size of the magnetic particles which are suitable. A magnetic particle coverage for the magnetic layer of from about 10 to 1000 $mg/m^2$, when uniformly distributed across the imaging area of a photographic imaging element, provides a magnetic layer that is suitably transparent to be useful for photographic imaging applications for magnetic particles with a maximum primary particle size of less than about 0.1 $\mu m$. Magnetic particle coverages less than about 10 $mg/m^2$ tend to be insufficient for magnetic recording purposes using inductive write/read heads.

Magnetic particle coverages greater than about 1000 $mg/m^2$ tend to produce magnetic layers with optical densities too high for photographic imaging. To minimize layer thicknesses, particle coverages of less than 200 $mg/m^2$ are desired, while particularly useful particle coverages are in the range of 20 to 70 $mg/m^2$. Magnetic particle volume concentrations in the coated layers of from about $1\times10^{-11}$ $mg/mm^3$ to $1\times10^{-10}$ $mg/mm^3$ are particularly preferred for transparent magnetic layers prepared for use in photographic elements of this invention. A typical thickness for the transparent magnetic layer is in the range from about 0.05 to 10 $\mu m$, preferably less than 4 $\mu m$, more preferably less than or equal to 1.2 $\mu m$, even more preferably less than or equal to 0.7 $\mu m$ and most preferably less than or equal to 0.5 $\mu m$. Practical difficulties exist in making thin films, including preparation of high quality, narrow size distribution dispersions of small particles of magnetic pigments, abrasive/head polishing powders and anti stat particles. Other difficulties include maintaining coating thickness uniformity and achieving good layer adhesion and durability. Such difficulties may be addressed in accordance with the teachings of the above and below referenced patents.

In order to provide the magnetic recording capacity for the purpose of the present invention, the properties of the transparent magnetic recording layer on the motion picture film and the write/read recording heads together with the encoding system must be capable of recording density of at least 1000 bits/track/frame, and preferably, at least 2000 bits/track/frame. The Advanced Photo System specification (Eastman Kodak Company, Release 4.30, Oct. 17, 1997) defines a maximum recording density of 120 flux transitions per millimeter. The cameras used in this system, being low-cost consumer devices, have film-transport mechanisms that exhibit high levels of instantaneous speed variation (known as "jitter"). In order to accommodate this, a jitter-tolerant—and consequently low-efficiency—modulation code is used. This self-clocking peak position modulation code uses three flux transitions to code each data bit, which limits the data-storage density of the system to (120 flux transitions per millimeter)÷(3 flux transitions per bit)=40 bits per millimeter. The significantly reduced levels of jitter to be expected in motion-picture cameras should enable the use of a highly efficient, jitter-tolerant nonlinear run-length-limited modulation code such as that taught in U.S. Pat. No. 5,742,244. Such a code requires as few as 1.25 flux transitions to code one bit while accommodating moderate levels of jitter. The use of such a code would provide a storage density of (120 flux transitions per millimeter)÷(1.25 flux transitions per bit)=96 bits per millimeter. Using a reasonable error-correction and data-format overhead of 25%, 75% of the data stored is available for user data, resulting in an effective storage density of (96×0.75)=72 bits per millimeter. Given a reasonable track length per frame of 19 millimeters, (72×19)=1368 bits can be stored per track per frame. This should allow enough capacity for recording multiple subtitles and display information.

Suitable polymeric binders for use in the magnetic layer include, for example: vinyl chloride based copolymers such as, vinyl chloride-vinyl acetate copolymers, vinyl chloride-vinyl acetate-vinyl alcohol terpolymers, vinyl chloride-vinyl acetate-maleic acid terpolymers, vinyl chloride-vinylidene chloride copolymers, vinyl chloride-acrylonitrile copolymers ; acrylic ester-acrylonitrile copolymers, acrylic ester-vinylidene chloride copolymers, methacrylic ester-vinylidene chloride copolymers, methacrylic ester-styrene copolymers, thermoplastic polyurethane resins, phenoxy resins, polyvinyl fluoride, vinylidene chloride-acrylonitrile copolymers, butadiene-acrylonitrile copolymers, acrylonitrile-butadiene-acrylic acid terpolymers, acrylonitrile-butadiene-methacrylic acid terpolymers, polyvinyl butyral, polyvinyl acetal, cellulose derivatives such as cellulose esters including cellulose nitrate, cellulose acetate, cellulose diacetate, cellulose triacetate, cellulose acetate butyrate, cellulose acetate propionate, and mixtures thereof, and the like; styrene-butadiene copolymers, polyester resins, phenolic resins, epoxy resins, thermosetting polyurethane resins, urea resins, melamine resins, alkyl resins, urea-formaldehyde resins and other synthetic resins. Preferred binders for organic solvent-coated transparent magnetic layers are polyurethanes, vinyl chloride-based copolymers and cellulose esters, particularly cellulose diacetate and cellulose triacetate.

The binder for transparent magnetic layers can also be film-forming hydrophilic polymers such as water soluble polymers, cellulose ethers, latex polymers and water soluble polyesters as described in Research Disclosures Nos. 17643 (December, 1978) and 18716 (November, 1979) and U.S. Pat. Nos. 5,147,768; 5,457,012; 5,520,954 and 5,531,913. Suitable water-soluble polymers include gelatin, gelatin derivatives, casein, agar, starch derivatives, polyvinyl alcohol, acrylic acid copolymers, and maleic acid anhydride. Suitable cellulose ethers include carboxymethyl cellulose and hydroxyethyl cellulose. Other suitable aqueous binders include aqueous latices of addition-type polymers and interpolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and methacrylonitrile, vinyl acetates, vinyl ethers, vinyl chloride copolymers and vinylidene chloride copolymers, and butadiene copolymers and aqueous dispersions of polyurethanes or polyesterionomers. The preferred hydrophilic binders are gelatin, gelatin derivatives and combinations of gelatin with a polymeric cobinder. The gelatin may be any of the so-called alkali- or acid-treated gelatins.

Optionally, the binder in the magnetic layer may be cross-linked. Binders which contain active hydrogen atoms including —OH, —NH(2), —NHR, where R is an organic radical, and the like, can be crosslinked using an isocyanate or polyisocyanate as described in U.S. Pat. No. 3,479,310. Suitable polyisocyanates include: tetramethylene diisocyanate, hexamethylene diisocyanate, diisocyanato dimethylcyclohexane, dicyclohexylmethane diisocyanate, isophorone diisocyanate, dimethylbenzene diisocyanate, methylcyclohexylene diisocyanate, lysine diisocyanate, tolylene diisocyanate, diphenylmethane diisocyanate, polymers of the forgoing, polyisocyanates prepared by reacting an excess of an organic diisocyanate with an active hydrogen containing compounds such as polyols, polyethers and polyesters and the like, including ethylene glycol, propylene glycol, dipropylene glycol, butylene glycol, trimethylol propane, hexanetriol, glycerine sorbitol, pentaerythritol, castor oil, ethylenediamine, hexamethylenediamine, ethanolamine, diethanolamine, triethanolamine, water, ammonia, urea, and the like, including biuret compounds, allophanate compounds and the like. A preferred polyisocyanate crosslinking agent is the reaction product of trimethylol propane and 2,4-tolylene diisocyanate sold by Mobay under the tradename Mondur CB 75.

The hydrophilic binders can be hardened using any of a variety of means known to one skilled in the art. Useful hardening agents include aldehyde compounds such as formaldehyde, ketone compounds, isocyanates, aziridine compounds, epoxy compounds, chrome alum, and zirconium sulfate.

Examples of suitable solvents for coating the transparent magnetic layer include: water; ketones, such as acetone, methyl ethyl ketone, methylisobutyl ketone, tetrahydrofuran, and cyclohexanone; alcohols, such as methanol, ethanol, isopropanol, and butanol; esters such as ethyl acetate and butyl acetate, ethers; aromatic solvents, such as toluene; and chlorinated hydrocarbons, such as carbon tetrachloride, chloroform, dichloromethane; trichloromethane, trichloroethane; glycol ethers such as ethylene glycol monomethyl ether, and propylene glycol monomethyl ether; and ketoesters, such as methylacetoacetate. Optionally, due to the requirements of binder solubility, magnetic particle dispersability and coating rheology, a mixture of solvents may be advantageous. A preferred solvent mixture consists of a chlorinated hydrocarbon, ketone and/or alcohol, and ketoesters. Another preferred solvent mixture consists of a chlorinated hydrocarbon, ketone and/or alcohols, and a glycol ether. Preferred solvent mixtures include dichloromethane, acetone and/or methanol, methylacetoacetate; dichloromethane, acetone and/or methanol, propylene glycol monomethyl ether; and methylethyl ketone, cyclohexanone and/or toluene.

As indicated hereinabove, the transparent magnetic layer also may contain additional optional components such as dispersing agents, wetting agents, surfactants or fluorinated surfactants, coating aids, viscosity modifiers, soluble and/or solid particle dyes, antifoggants, matte particles, lubricants, abrasive particles, filler particles, and other addenda that are well known in the photographic and magnetic recording arts.

Useful dispersing agents include fatty acid amines, and commercially available wetting agents such as Witco Emcol CC59 which is a quaternary amine available from Witco Chemical Corp; Rhodofac PE 510, Rhodofac RE 610, Rhodofac RE 960, and Rhodofac LO 529 which are phosphoric acid esters available from Rhone-Poulenc; and polyester-polyamine copolymers described in commonly-assigned U.S. Pat. No. 5,395,743 and which are commercially available as Solsperse 17000, Solsperse 20000, and Solsperse 24000 from Zeneca, Inc. or PS2 and PS3 from ICI.

Suitable coating aids include nonionic fluorinated alkyl esters such as, FC-430 and FC-431 sold by Minnesota Mining and Manufacturing; polysiloxanes such as DC 1248, DC 200, DC 510, DC 190 sold by Dow Coming; and BYK 310, BYK 320, and BYK 322 sold by BYK Chemie; and SF 1079, SF 1023, SF 1054, and SF 1080 sold by General Electric.

Examples of reinforcing filler particles include nonmagnetic inorganic powders with a Moh scale hardness of at least 6. Examples of suitable metal oxides include gamma alumina, chromium (+3) oxide, alpha iron oxide, tin oxide, silica, titania, aluminosilicates, such as zeolites, clays and clay-like materials. Other suitable filler particles include various metal carbides, nitrides, and borides. Preferred filler particles include gamma alumina and silica as taught in U.S. Pat. No. 5,432,050.

Abrasive particles exhibit properties similar to those of reinforcing particles and include some of the same materials, but are typically much larger in size. Abrasive particles are present in the transparent magnetic layer to aid in cleaning of the magnetic heads as is well-known in the magnetic recording art. Preferred abrasive particles are alpha aluminum oxide and silica as disclosed in Research Disclosure, Item No. 36446 (August 1994).

A representative formulation which may be used to form a magnetic recording layer on a photographic film for use in accordance with the invention is as follows:

| Component | Description | Dry Coating Wt, mg/m² |
|---|---|---|
| Magnetic oxide | CSF-408542 Co-γ-Fe₂O₃ (Toda Kogyo Corp.) | 55 |
| Polymer binder | Cellulose diacetate (Eastman Chemical Co.) | 1248 |
| Polymer binder | Cellulose triacetate (Eastman Chemical Co.) | 55 |
| Abrasive particle (head cleaner) | E-600 (Norton) | 36 |
| Grind Solvent | Dibutyl phthalate | 78 |
| Coating Aid | FC-431 (3M Corp.) | 7.2 |
| Dispersant | Rhodafac PE510 (Rhone-Poulenc) | 4.4 |
| Dry Layer Thickness: | 1.2 μm | |

Additional layers which may be present either above or below the transparent magnetic layer in the motion picture films in accordance with this invention include but are not limited to antistatic layers, abrasion and scratch resistant layers, other protective layers, abrasive-containing layers, adhesion-promoting layers, antihalation layers and lubricant-containing layers overlying the magnetic layer for improved film conveyance and runnability during magnetic reading and writing operations.

Any antistatic materials may be employed in the antistatic layer, such as those previously suggested for use with photographic elements. Such materials include, e.g., ionic polymers, electronic conducting non-ionic polymers, and metal halides of metal oxides in polymer binders. Conductive fine particles of crystalline metal oxides dispersed with a polymeric binder have been used to prepare optically transparent, humidity insensitive, antistatic layers for various imaging applications. Many different metal oxides, such as AnO, $TiO_2$, $ZrO_2$, $Al_2O_3$, $SiO_2$, MgO, BaO, $MoO_3$, and $V_2O_5$, are disclosed as useful as antistatic agents in photographic elements or as conductive agents in electrostatographic elements in such patents as U.S. Pat. Nos. 4,275,103; 4,394,441; 4,416,963; 4,418,141; 4,431,764; 4,495,276; 4,571,361; 4,999,276; and 5,122,445, the disclosures of which are hereby incorporated by reference. Preferred metal oxides are antimony doped tin oxide, aluminum doped zinc oxide, and niobium doped titanium oxide, as these oxides have been found to provide acceptable performance characteristics in demanding environments. Particular preferred metal oxides for use in films in accordance with the invention are antimony-doped tin oxide and vanadium pentoxide which provide good resistance to static discharge.

Suitable lubricants include silicone oil, silicones or modified silicones, fluorine-containing alcohols, fluorine-containing esters, polyolefins, polyglycols, alkyl phosphates and alkali metal salts thereof, polyphenyl ethers, fluorine-containing alkyl sulfates and alkali metal salts thereof, monobasic fatty acids having 10 to 24 carbon atoms and metal salts thereof, alcohols having 12 to 22 carbon atoms, alkoxy alcohols having 12 to 22 carbon atoms, esters of monobasic fatty acids having one of monovalent, divalent, trivalent, tetravalent, pentavalent and hexavalent alcohols, fatty acid esters of monoalkyl ethers of alkylene oxide polymers, fatty acid amides and aliphatic amines.

Specific examples of these compounds (i.e., alcohols, acids or esters) include lauric acid, myristic acid, palmitic acid, stearic acid, behenic acid, butyl stearate, oleic acid, octyl stearate, amyl stearate, isocetyl stearate, octyl myristate, butoxyethyl stearate, anhydrosorbitan monostearate, anhydrosorbitan distearate, anhydrosorbitan tristearate, pentaerythrityl tetrastearate, oleyl alcohol and lauryl alcohol. Carnauba wax is preferred.

Representative examples of backing layer packages comprising a transparent magnetic recording layer, an antistatic layer, and a thin lubricant layer which may be employed in the motion picture films for use in accordance with the invention are disclosed, e.g., in U.S. Pat. Nos. 5,395,743; 5,397,826; 5,427,900; 5,432,050; 5,436,120; and 5,424,037, the disclosures of which are incorporated by reference herein.

The antihalation undercoat layer that may be employed in the photographic films useful in this invention functions to prevent light from being reflected into the silver halide emulsion layer(s) and thereby causing an undesired spreading of the image which is known as halation. Any of the filter dyes known to the photographic art can be used in the present invention as a means of reducing halation. Thus, for example, water-soluble dyes can be used for this purpose. Such dyes should be incorporated in the antihalation undercoat with a mordant to prevent dye diffusion. Alternatively, and preferably, a solid particle filter dye is incorporated in the antihalation undercoat. Soluble and solid particle filter dyes that may successfully employed in the antihalation layer include those described in commonly-assigned U.S. Pat. No. 5,679,505 which is incorporated herein by reference.

In addition to a transparent magnetic recording layer, one or more silver halide emulsion layers, and optional antihalation underlayer and antistatic layer, the photographic films useful for the present invention can contain auxiliary layers conventional in photographic elements, such as overcoat layers, spacer layers, electrically conductive layers, filter layers, interlayers, pH lowering layers (sometimes referred to as acid layers and neutralizing layers), timing layers, opaque reflecting layers, opaque light-absorbing layers and the like.

The invention has been described in detail with particular reference to certain preferred embodiments thereof, but it will be understood that variations and modifications can be effected within the spirit and scope of the invention.

We claim:

1. A process for viewing a motion picture film scene image with concurrently displayed subtitle text comprising:

providing a motion picture print film comprising a support bearing at least one light sensitive image recording layer and a transparent magnetic recording layer, wherein the print film additionally comprises an antihalation undercoat layer between the support and the light sensitive image recording layer and an antistatic layer;

printing a negative film scene image onto the motion picture print film to form a positive scene image;

recording subtitle information in the magnetic recording layer in synchronization with the scene image;

projecting the print film scene image for viewing while simultaneously reading the subtitle information recorded in the magnetic recording layer; and converting the subtitle information to text comprising alphanumeric characters and displaying the subtitle text in conjuction with the projected screen image.

2. A process according to claim 1, wherein the subtitle information is recorded in the magnetic recording layer within an image frame to which it corresponds.

3. A process according to claim 1, wherein the subtitle text is projected on a theater screen superimposed with the film image.

4. A process according to claim 1, wherein the subtitle text is shown on a separate display adjacent to a theater screen on which the scene image is projected.

5. A process according to claim 1, wherein the subtitle information is recorded in the magnetic recording layer during a contact printing operation that is used to transfer the film scene image from an exposed and processed negative film to the print film.

6. A process according to claim 1, wherein the subtitle information is recorded after optical printing of the scene image in the print film.

7. A process according to claim 1, wherein the magnetic recording layer comprises magnetic particles at a coverage in the range of 20 to 70 mg/m$^2$.

8. A process according to claim 7, wherein the magnetic recording layer thickness is less than 4 $\mu$m.

9. A process according to claim 7, wherein the magnetic recording layer thickness is less than or equal to 1.2 $\mu$m.

10. A process according to claim 1, wherein the magnetic recording layer thickness is less than 4 $\mu$m.

11. A process according to claim 1, wherein the magnetic recording layer thickness is less than or equal to 1.2 $\mu$m.

12. A process according to claim 1, wherein subtitle information recorded in the magnetic recording layer includes subtitle text information for multiple languages and a code to identify each language so that subtitles for a particular language or languages can be selectively read and displayed.

13. A process according to claim 1, wherein subtitle information recorded in the magnetic recording layer includes color or intensity display information for the subtitle, and wherein the color or intensity of the subtitle text displayed in conduction with the projected screen image is adjusted depending on the brightness and color of the screen image.

* * * * *